Patented Nov. 29, 1932

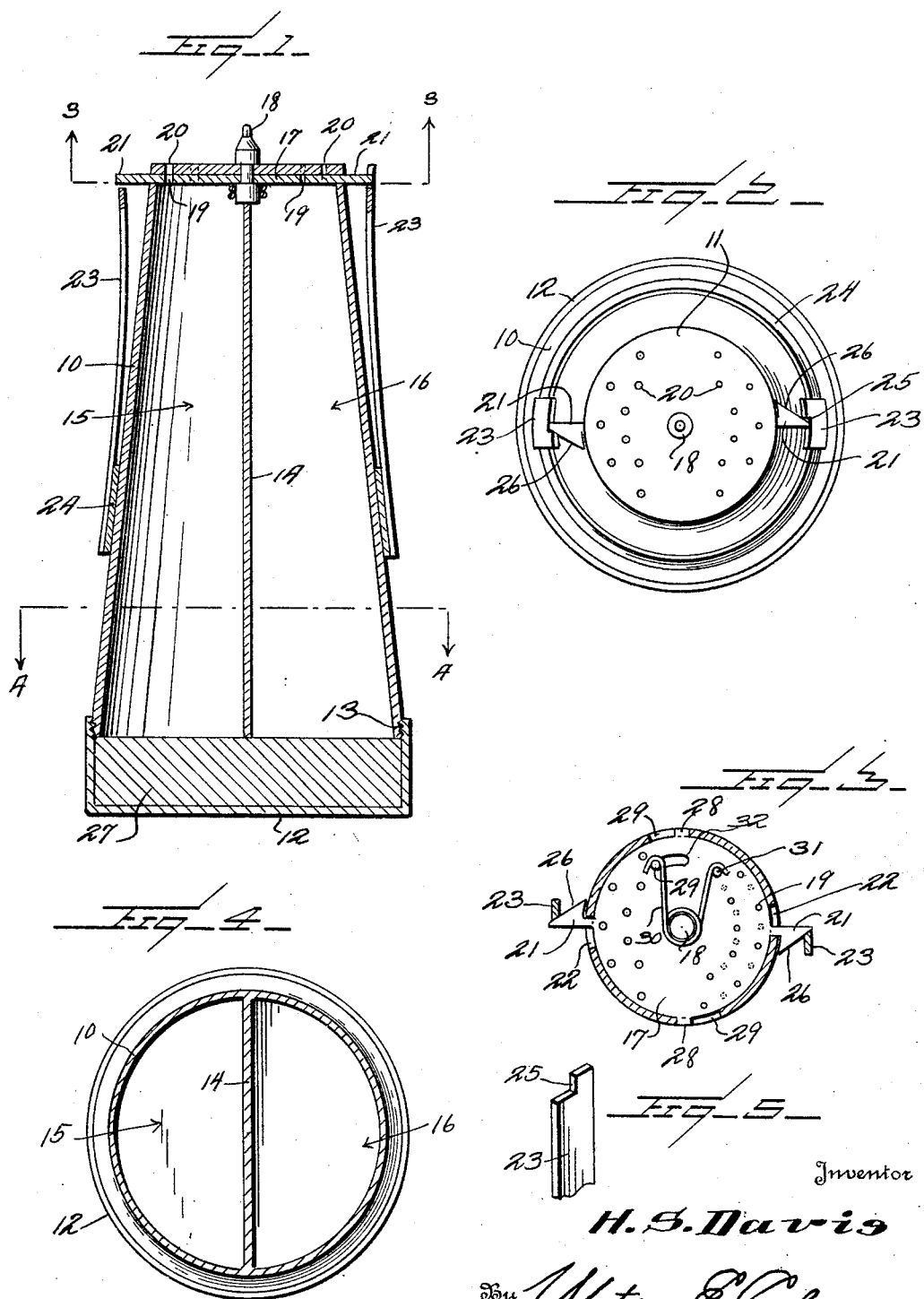

1,889,593

UNITED STATES PATENT OFFICE

HARRY S. DAVIS, OF SAN ANTONIO, TEXAS

CONDIMENT SHAKER

Application filed February 25, 1931. Serial No. 518,232.

The present invention relates to condiment holders and more particularly to a holder adapted to hold a plurality of condiments which are adapted to be selectively removed therefrom.

An object of this invention is to provide in a shaker a plurality of compartments and means by which the condiments in the various compartments may be selectively removed therefrom.

Another object of this invention is to provide in a condiment holder means by which the condiments may be selectively removed therefrom, the selective means being yieldably positioned upon the exterior of the holder.

A further object of this invention is to provide a device of this character which may be readily and cheaply manufactured.

The above and various other objects and advantages of this invention will in part be described in and in part be understood from the following detailed description of the present preferred embodiment, the same being illustrated in the accompanying drawing wherein:—

Figure 1 is a longitudinal sectional view of a device constructed according to the preferred embodiment of this invention;

Figure 2 is a detail top plan view of the device;

Figure 3 is a transverse sectional view taken on the line 3—3 of Figure 1;

Figure 4 is a transverse sectional view taken substantially on the line 4—4 of Figure 1; and Figure 5 is a fragmentary perspective view of one of the resilient operating members.

Referring to the drawing wherein like numerals of reference designate corresponding parts throughout the several views, the numeral 10 designates a casing which is provided with an apertured top 11 and a removable bottom 12. In the preferred embodiment of this invention, the casing 10 is provided at the bottom thereof with a threaded portion 13 so that the bottom 12 may be threadably engaged thereon, but it will, of course, be understood that the bottom or cap member 12 may be otherwise secured to the casing. The casing 10 is provided with an inner wall member 14 which extends longitudinally therethrough so as to divide the casing into a pair of compartments 15 and 16. The compartments 15 and 16 are adapted to hold the desired condiments such as salt and pepper or any other desired condiments. This top 11 may be secured in any desired manner to the casing 10 and to the inner wall 14 as by soldering, welding or the like. The inner wall 14 which extends longitudinally of the casing 10, may be integrally formed with the casing 10, or if desired, may be inserted within the casing 10 or soldered, welded or otherwise secured in the desired position.

A rotatable plate member 17 is mounted on the inner face portion of the top 11, being rotatably held by a pivot member 18. The rotatable plate 17 is provided with a plurality of apertures 19 which selectively register with the apertures 20 in the top 11. The plate member 17 is provided with a pair of outstanding pawl members 21 which extend outwardly of the casing through apertures 22 or the like, the apertures 22 being elongated so that the pawl members 21 will loosely engage the casing 10.

A pair of resilient pawl engaging members 23 are mounted upon a ring or annular member 24 which is positioned upon the periphery of the casing 10 spaced inwardly from the opposite end portions thereof. The pawl engaging members 23 are provided with notches or cut out portions 25 so as to engage the angular portion 26 of the pawl members.

The bottom cap member 12 is adapted to receive a quantity of weighted material 27 or the like and, if desired, the filling material 27 may be of plaster of Paris, lead or any other weighted material which may be readily mounted within the cap, the filling 27 being adapted to engage against the lower edge portions of the inner wall member 14 so as to prevent the various condiments within the compartments 15 and 16 from intermixing. The filling material 27 will also tend to maintain the casing 10 in upright position.

In the preferred embodiment of this invention, the casing 10 is constructed in the form of a frusto-conical member but it is, of course, understood that the casing 10 may be formed into any desired configuration.

The plate member 17 is provided with a pair of outstanding lugs or stop members 28 which are adapted to loosely engage the casing 10 in slots 29 positioned adjacent the upper end portion thereof. If desired, a number of inner wall members 14 may be provided and, in like manner, a number of plate members 17 may be rotatably mounted on the top member 11 so that any desired number of condiments may be placed in the casing and the rotatable selective members 17 rotated also as to permit the removal of the desired condiment.

The shaker herein disclosed is assembled in the following manner: The top plate 11 is provided with an axially disposed aperture for receiving the securing pin 18 and the rotatable plate 17 is rotatably mounted on this pin 18 which may be turned over or otherwise formed, so that the plate 17 is rotatably or swivelly mounted on one face of the top plate 11. The central portion of the inner wall 14 at the top thereof is provided with a suitable recess or cut out portion, so that the depending portion of the pin 18 may extend downwardly to a point where the top 11 will engage the upper end of the casing 10. The outstanding pawls 21 and the stop members 28 will be engaged in the respective slots 22 and 29 whereupon the top 11 may be soldered, welded or otherwise secured to the upper end of the casing 10.

In the use of this device, the bottom member 12 may be removed therefrom and the desired condiments placed into the inner compartments 15 and 16. The bottom 12 may then be threaded onto the casing 10 and the device is then ready for use. The rotatable member 17 is normally held on the pivot 18 in position so that one series of openings 19 are in engagement with a complementary series of openings 20 in the top 11.

The top 11 may be provided with a depending lug member 29 and a spring or yieldable member 30 connected at one end to the lug 29 and at the opposite end to the plate member 17 as at 31, the central portion of the spring being preferably loosely wound about the pivotal member 18 so as to normally hold the plate member in position so that one series of openings 19 are in constant communication with a complementary series of openings 20 in the top. The plate member 17 is provided with an arcuately inclined slot 32 which is adapted to loosely receive the pin or lug 29. When the plate member 17 is rotated about the pivot 18 by pressing inwardly the yieldable members 23, one of the series of openings 19 in the plate 17 will move out of register with the complementary series of openings 20 in the top, and the other series of openings 19 will come into register with the other series of openings 20 in the top so that the condiment in the opposite chamber may be removed therefrom.

It will, of course, be understood that various changes and modifications may be made in the details of construction and design of the above specifically described embodiment of the invention without departing from the spirit thereof, such changes and modifications being restricted only by the scope of the following claims.

What is claimed is:—

1. A condiment shaker comprising a casing having an open bottom, a closure member for said bottom, an apertured top for said casing, said apertures in said top being arranged in series, an inner wall member mounted in said casing and adapted to divide the casing into a plurality of compartments, a pivot secured to said top, a rotatable apertured closure member mounted on said pivot and positioned within said casing, said rotatable closure member having outwardly extending pawl members, said pawl members extending outwardly through the casing, and resilient pawl engaging members carried by the casing.

2. A condiment holder comprising a casing, said casing having a threaded portion adjacent the bottom thereof, a closure member threadably engaging said threaded portion of said casing, an inner wall member mounted in the casing and adapted to divide the casing into a plurality of compartments, an apertured top for said casing, a rotatable apertured closure member carried by said top and positioned within the casing, said rotatable member having outwardly extending pawl members, yieldable means adapted to engage said pawl members whereby to rotate said rotatable member, and means for mounting said yieldable means on said casing.

In testimony whereof I hereunto affix my signature.

HARRY S. DAVIS.